United States Patent [19]

Shea

[11] Patent Number: 5,781,115
[45] Date of Patent: Jul. 14, 1998

[54] APPARATUS AND METHOD FOR DETECTION AND THICKNESS MEASUREMENT OF COATINGS OVER A SURFACE

[75] Inventor: Donald F. Shea, Plano, Tex.

[73] Assignee: Target Microwave, Plano, Tex.

[21] Appl. No.: 415,415

[22] Filed: Apr. 3, 1995

[51] Int. Cl.[6] .................................................. G08B 19/02
[52] U.S. Cl. ........................ 340/580; 244/134 F; 340/691; 340/815.65; 340/962
[58] Field of Search .................. 340/580–583, 340/962, 691, 815.65; 244/134 F

[56] References Cited

U.S. PATENT DOCUMENTS

| | | | |
|---|---|---|---|
| 3,243,793 | 3/1966 | Goldman | 340/580 |
| 3,946,286 | 3/1976 | Kinnunen et al. | 340/583 X |
| 4,054,255 | 10/1977 | Magenheim | 244/134 F |
| 4,690,553 | 9/1987 | Fukamizu et al. | 356/51 |
| 4,797,660 | 1/1989 | Rein, Jr. | 340/583 |
| 4,833,660 | 5/1989 | Deom et al. | 367/157 |
| 5,005,015 | 4/1991 | Dehn et al. | 340/962 |
| 5,180,122 | 1/1993 | Christian et al. | 244/134 F |
| 5,296,853 | 3/1994 | Federow et al. | 340/962 |
| 5,318,254 | 6/1994 | Shaw et al. | 244/134 C |
| 5,475,370 | 12/1995 | Stern | 340/583 |

FOREIGN PATENT DOCUMENTS

| | | |
|---|---|---|
| 461953 | 12/1991 | European Pat. Off. . |
| 3640539 | 11/1986 | Germany . |
| 764032 | 9/1980 | U.S.S.R. . |
| 913344 | 3/1982 | U.S.S.R. . |

OTHER PUBLICATIONS

National Technical Report (Japan) vol. 24, No. 3 Jun. 1978, Sato (Translation).

*Primary Examiner*—Thomas Mullen
*Attorney, Agent, or Firm*—John E. Vandigriff

[57] ABSTRACT

The invention is to a system and method for detecting materials on a conductive surface and measuring the thickness and permittvity of the material. A polarized Radio Frequency signal is reflected from a conduction surface having a material thereon. The reflected de-polarized signal is then processed to determine the thickness and permittivity of the material on the conductive surface.

21 Claims, 7 Drawing Sheets

APPARATUS AND METHOD FOR DETECTION AND THICKNESS MEASUREMENT OF COATINGS OVER A SURFACE

FIELD OF INVENTION

This invention relates to the detection of ice on aircraft surfaces; and more particularly to an apparatus and method for the detection and thickness measurement of coatings over surfaces.

BACKGROUND OF THE INVENTION

Every year, thousands of hours of flight delays are incurred in commercial and military aviation due to icing conditions. Unfortunately, aircraft icing is not always detected before takeoff and crashes occur. The inherent problem of determining when to deice an aircraft requires an overly conservative, and thus wasteful, approach by aircraft operators. Because of the importance of flight safety, it is necessary to err on the safe side and, if in doubt, deice. This not only costs airlines, and the military, time and money, it creates additional environmental pollution in the form of copiously applied deicing fluid. Because of backups on taxiways and the time elapsed since initial deicing, it is not uncommon to require an aircraft to return to the deicing station and repeat the process before takeoff. Serious economic loss also results from flight delays and cancellations, icing also results in an equally significant cost on the highways of the nation in terms of shipping delays, damage from accidents, and worst of all, personal injury and loss of life. A system which could detect and measure ice buildup on aircraft structures, highways, overpasses and bridges would offer significant safety and cost benefits to the transportation industry.

SUMMARY OF THE INVENTION

The invention relates to a system and method for determining ice build-up on aircraft and other surfaces by uniquely employing electromagnetic energy to detect the presence of ice on a surface such as the wing of an airplane. Ice detection utilizes the principle that when a polarized electromagnetic wave impinges on the surface of a material, at some incident angle, the polarization of the reflected wave is a function of the electrical properties and thickness of the material as well as the frequency and polarization of the incident wave. For example, it is well known in electromagnetic theory that when a wave impinges on a perfectly conducting surface, the tangential component of the waves polarization undergoes a phase reversal while the perpendicular component does not. This is why a circularly polarized wave reverses polarization sense when reflected from a metal surface. When a polarized electromagnetic wave impinges on the surface of an insulating material, the effect on polarization is both a function of incident angle and the permittivity of the material.

The apparatus of the invention used for aircraft would include a sensor which detects and estimates thickness of the ice on the aircraft's surface. A sensor, including a Radio Frequency transmitter and receiver is passed over the aircraft to determine ice build-up and to determine if de-icing is necessary. Also, a drive through deicing station can be integrated with an ice detection station located near the take-off point of the runway. De-icing just prior to takeoff is the optimum point as it would negate ice buildup between push-off from the gate and takeoff.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1:
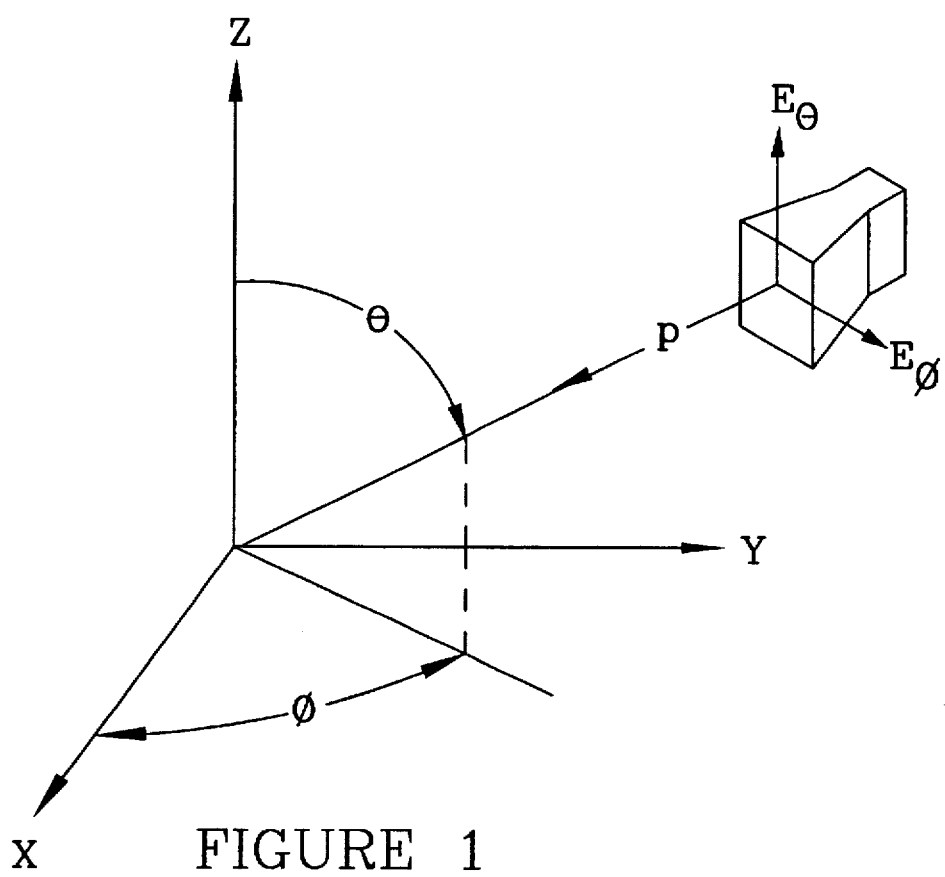
FIG. 1 is a definition of polarization as used in the invention.

Polarization can be defined by the spatial orientation and time-phase relationship between two orthogonal, time variant electric fields, $E_\theta$ and $E_\phi$. The coordinate system, FIG. 1, shows that $E_\theta$ lies in a plane formed by the z-axis and the radiation vector P, and is perpendicular to the radiation vector P; $E_\phi$ lies in a plane parallel to the x-y plane and is both perpendicular to $E_\theta$ and the radiation vector P. In this way both direction of propagation and polarization of an electromagnetic wave are defined.

An electromagnetic wave is linearly polarized if the phase angle between the two field components is equal to zero or multiples of 180°; or when either one of the components vanish. The wave is circularly polarized when the magnitudes of $E_\theta$ and $E_\phi$ are equal and the phase difference is equal to odd multiples of 90°.

It may be observed that polarization of reflected energy from a smooth, conducting surface maintains its polarization except that the polarization component parallel to the surface undergoes a phase reversal in accordance with Maxwell's equations. This phase reversal causes a circularly polarized wave to reflect in the opposite sense and a slant linearly polarized wave to slant in the opposite direction; however, in all cases, the basic polarization of the incident wave is preserved. If the conducting surface were coated with an insulating material, wave depolarization occurs. Since ice is an insulator, it is possible to use this effect to detect the presence of ice or any other dielectric material on the metallic skin of an aircraft by illuminating its surface with a polarized electromagnetic wave and measuring the polarization change in the reflected wave. If the wing is constructed of a conductive non-metallic material, such as carbon-graphite filament reinforced composite, a reflection from an ice-free surface produces the identical polarization effect as that of metal. If coated with ice or other dielectric material, this surface will behave similar to that of a dielectrically coated metal.

Theory of Operation

Figure 2:
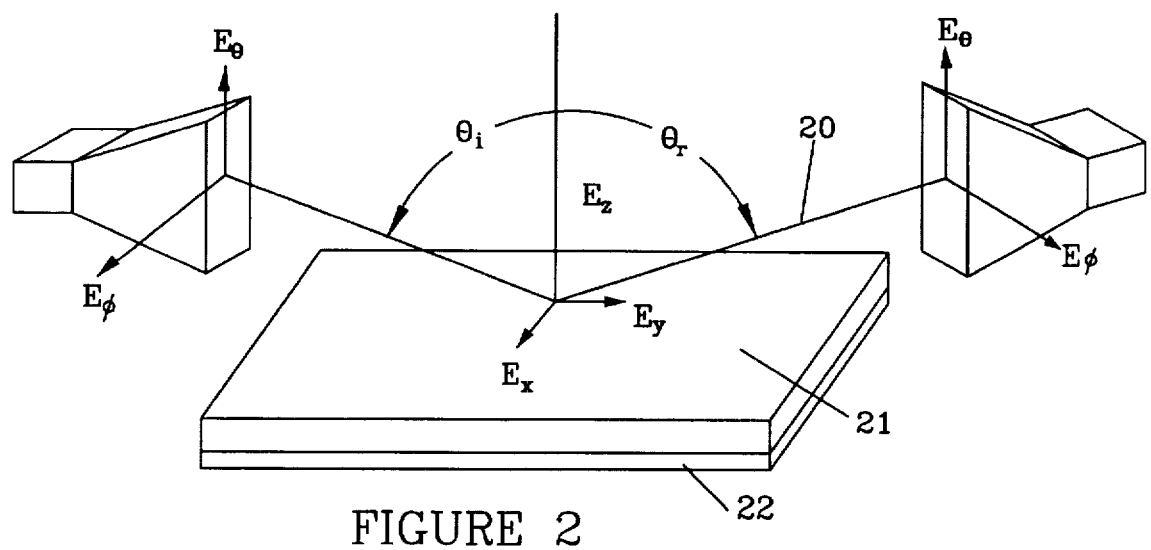
FIG. 2 is a reflection model showing a right slant polarized electromagnetic wave impinging on an insulated material over a conducting surface.

To illustrate the principle of operation, consider the diagram shown in FIG. 2 where a right slant polarized electromagnetic wave 20 is impinging on an insulating material 21 placed over a conducting surface 22. The wave 20, impinging on the insulating surface 21 contains both tangential (Ex and Ey) and perpendicular (Ez) electric field components at the surface boundary. In accordance with electromagnetic field theory, these two fields, Ex and Ey, penetrate and reflect from the material 21 differently. The energy from each field that penetrates into layer 21 will travel through it until the energy reaches the conducting surface 22 and then reflects totally back up through the material 21 and recombines with the initial surface reflection. Traveling through the insulating material 21 causes the energy to be phase shifted in accordance with the permittivity and thickness of the material. When the energy emerges from material 21 and recombines with energy from the initial reflection, the phase and amplitude relationships between the tangential and perpendicular polarization components are modified thus producing a different polarization in the reflected wave. To characterize the reflected wave's polarization merely requires a measurement of the relative amplitudes and phase difference between the $E_\theta$ and $E_\phi$ components of this wave. Because there are mathematical relationships between the incident and reflected wave polarizations, which are functions of frequency, incident angle, material thickness and permittivity of the material, it is possible to determine any one of these variables if the others are known. For example, if frequency, incident angle, incident wave polarization, and material thickness are known, and reflected polarization is measured, then permittivity of the insulating material may be calculated.

Conversely if permittivity of the insulating material is known (as it is for ice), then thickness of the insulating layer can be determined. If more than one independent measurement is taken, more than one unknown can be computed. For example, if data is taken at two frequencies, then two unknowns can be determined such as permittivity and thickness. The chart in FIG. 3 shows the effects on polarization produced by varying thicknesses of ice over metal being radiated by a slant linear polarized wave, at an angle of incidence of 30° and a frequency of 36 GHz.

Figure 3:
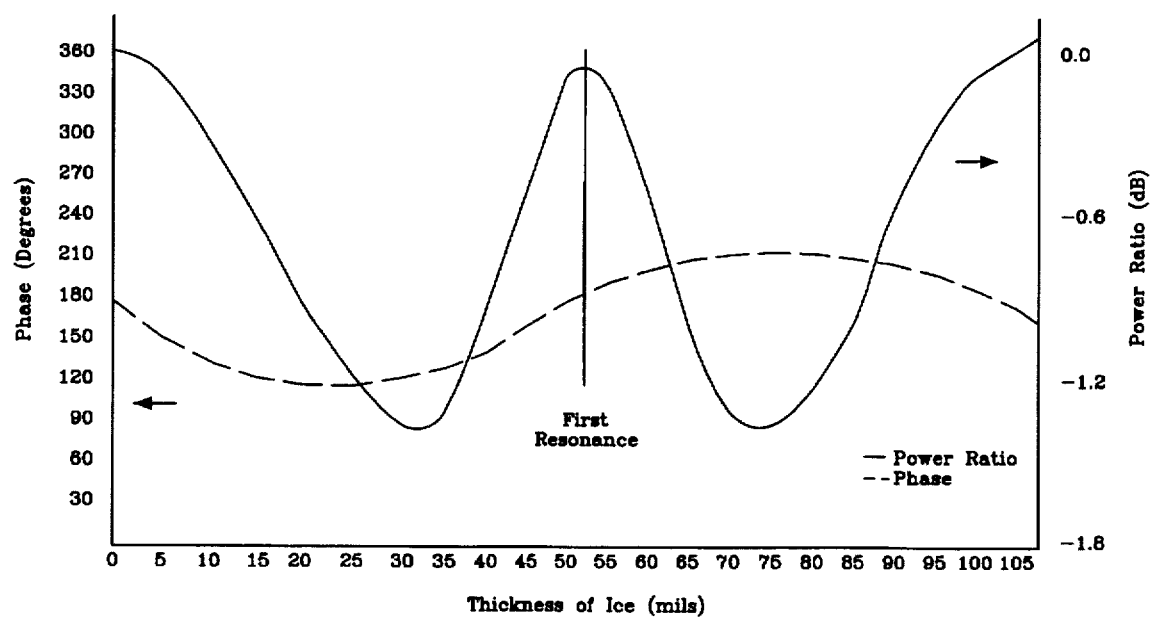
FIG. 3 shows the effects on polarization produced by varying thicknesses of ice over metal being radiated by a slant linear polarized wave, at an angle of incidence of 30.

It is seen from FIG. 3, when the surface is ice-free (t=0), the relative magnitudes, $E_\theta$ and $E_\phi$, of the reflected wave remain unaffected while the phase of $E_\phi$ reverses, as predicted by theory. This produces an oppositely slanted, linearly polarized wave. As the ice layer becomes thicker, both relative amplitude ($E_\theta/E_\phi$) and the phase difference (arg$E_\theta$– arg$E_\phi$) change. At a thickness of 0.030 inches, the reflected wave is seen to be no longer linearly polarized but very elliptical since the phase difference between components has changed by 40°. Even at 0.005 inches, about the thickness of a sheet of paper, the 10° phase shift seen between $E_\theta$ and $E_\phi$ would be detectable. The maximum change in polarization is FIG. 3 for a thickness of 0.030 inch, is a function of the material's permittivity; i.e. the higher the dielectric constant, the greater the change in phase and amplitude ratio.

As the ice thickness increases further, from 0.030 inch, the change in phase difference and amplitude ratio diminishes until the electrical path length through the dielectric material is 180 degrees; then no polarization change is observed and the layer of ice seems to disappear. This "resonant" effect is seen in FIG. 3 where the ice thickness is 0.055 inch. The frequency of resonance is therefore seen to be a function of the material's thickness, its permittivity being determined by the maximum change in polarization. Higher order resonances occur when the material's thickness is a multiple of 180 degrees. The characteristic change in polarization versus frequency therefore indicates not only existence of a coating material, but also it's permittivity and thickness.

Because polarization is unaffected by a homogenous, intervening medium and the distance traveled by the wave, this technique is unaffected by rain, freezing rain, fog or mist which are known to behave homogeneously at radio frequencies. Also, because snow has a dielectric constant too low to affect the measurements, ice beneath snow can be easily detected. A film of water or deicing fluid, over ice, produces a dramatically more pronounced characteristic frequency response than ice alone because both liquids have a much higher delectric constant than ice. For this case, the resonant frequency is a function of the displacement of the water film by the ice from the surface; therefore, it is still possible to detect the presence and thickness of ice even though it lies beneath a film of water or deicing fluid.

Although slant incident polarization has been postulated in the example, circular polarization works equally well. Even though other incident polarizations can be used, slant and circular are optimum because both perpendicular and tangential polarization components are present in equal magnitude.

This case has illustrated the principle of operation for an insulating material over a conducting material. The same principles apply where an insulating material of one permittivity lies over the surface of another insulating material of a different permittivity.

Figure 5:
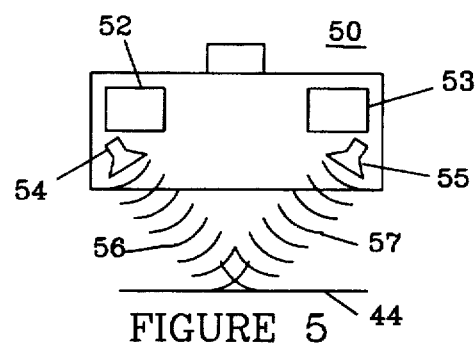
FIG. 5 illustrates the sensor used with the system of FIG. 4.
Figure 4:
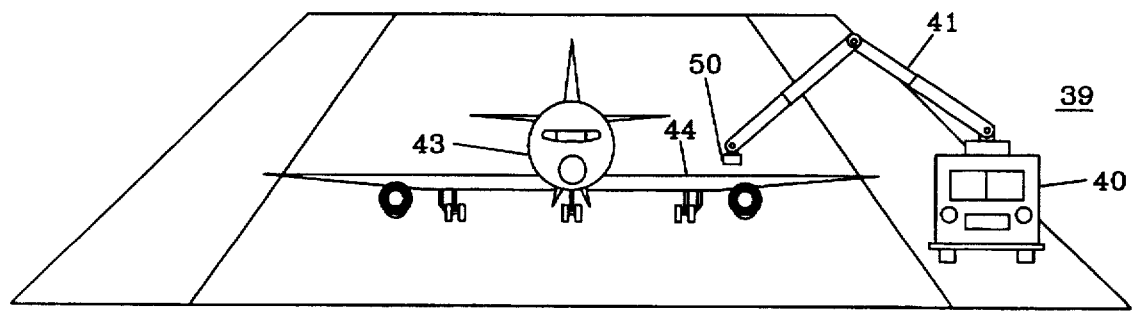
FIG. 4 illustrates an example of a system used in detecting aircraft icing.

FIG. 4 illustrates an example of a system used in detecting aircraft icing. A mobile system 39, carried by a vehicle 40, includes a movable arm 41 to which is attached a sensor 50. Sensor 50 includes a transmitter 52, receiver 53 and antennas 54 and 55 (FIG. 5). The transmit antenna 54 illuminates the wing surface 44 with a slant polarized wave 56 at a fixed angle of incidence (this angle is not critical and may be chosen to best suit the application). A phase and amplitude matched, dual polarized antenna 55, receives both polarization components ($E_\theta$ and $E_\phi$) of the reflected wave 57. A dual channel, phase, and amplitude matched receiver 53, tuned to the transmit frequency, then amplifies the signal for processing into phase and amplitude information, The relative amplitude and phase of $E_\theta$ and $E_\phi$, as measured by this system, defines the polarization of the received wave 57. The thickness of ice deposited on the wing is computed relating the surface boundary conditions to the received wave polarization.

FIG. 5 is a side view of sensor 50, showing the transmitter 52 at one end of the sensor 50 and the dual channel receiver and signal processor 53 at the other end of sensor 50. Transmitter 52 transmits the polarized signal 56 via antenna 54, which is a slant polarized transmit antenna, onto the airplane wing 44. The entire wing surface is examined by moving sensor 50 on arm 41 (FIG. 4). Vehicle 40 drives around airplane 43 to ensure that all wing and tail surfaces are examined for ice. The reflected signal 57 is received by dual polarized antenna 55 and relayed to the receiver 53.

Figure 6:
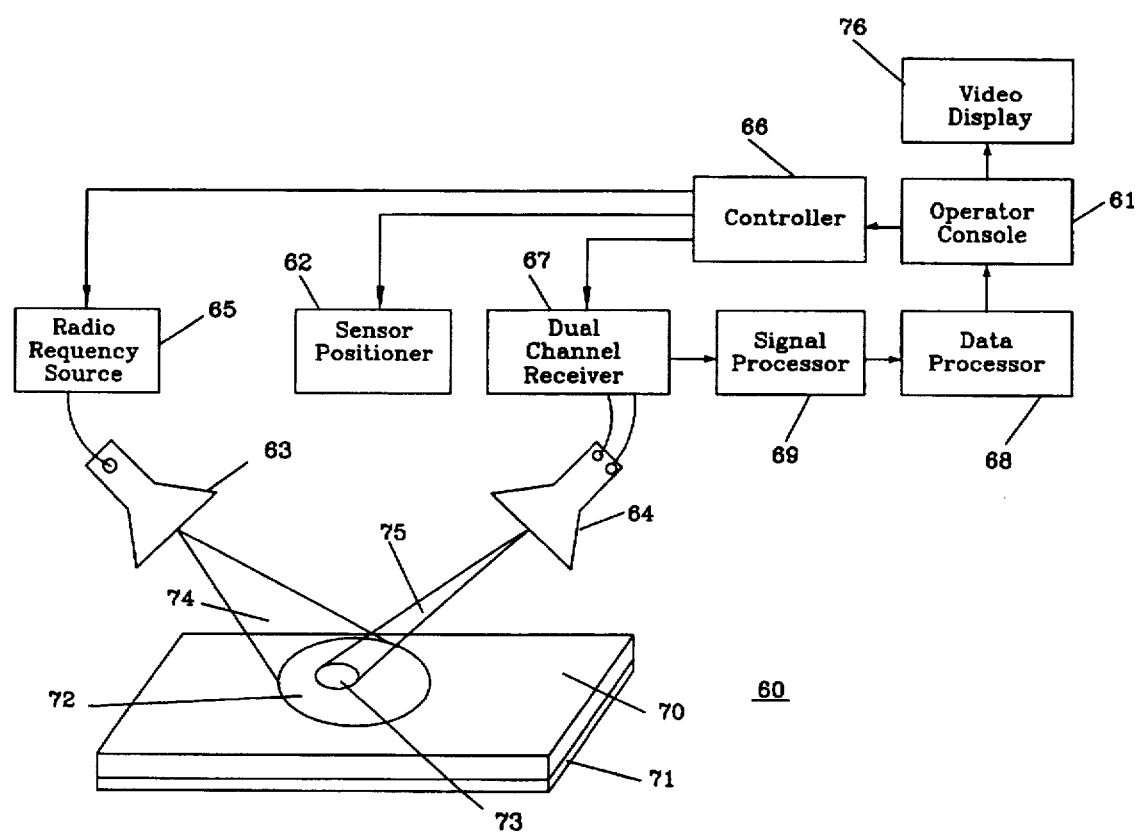
FIG. 6 shows an example of a deicing detection system.

FIG. 6 shows an example of a system 60 which can be utilized with the sensor of FIG. 5. An operator at console 61 positions sensor 50 (FIG. 4) over an area on an aircraft 43 (FIG. 4). The sensor positioner 62 positions antennas 63 and 64 over the aircraft and radiates an area 72 with a slant polarized wave 74 emitted from transmit antenna 63. The radiated area is on the aircraft where ice 70 overlays the aircraft's metallic surface 71. The wave is reflected from the target zone 72 in the form of a depolarized reflected wave. The processed area is the spot indicated by 73. Dual polarized receive antenna 64 electronically or mechanically scans the target zone 72 and conveys phase and amplitude information from the receive antenna into the dual channel receiver 67. Position of antennas 63 and 64, and scan angle of receive antenna 64, is set by the controller 66 which receives commands from a computer in the operator console 61. The receiver and radio frequency signal source also are controlled by controller 66, its commands being likewise generated by the computer in the operator console 61. Dual channel receiver 67 receives signals picked up by the dual polarized receive antenna 64 and outputs two intermediate frequency signals containing polarization information to the signal processor 69 which converts these signals into voltages proportional to the ratio of the magnitude of the received polarization energy in the reflected wave 75 and the phase difference between these components. These voltages are then transferred to the data processor 68 which encodes the polarization vector into a video signal in the form of color and hue. Sensor 50 position and receive antenna 64 scan angle are converted into an X- Y coordinate of the processed spot 73 by the computer in the operator console 61 and, along with the video signal, are output to the video display 76 creating a pictorial rendition of the aircraft surface showing where ice is present.

Figure 7:
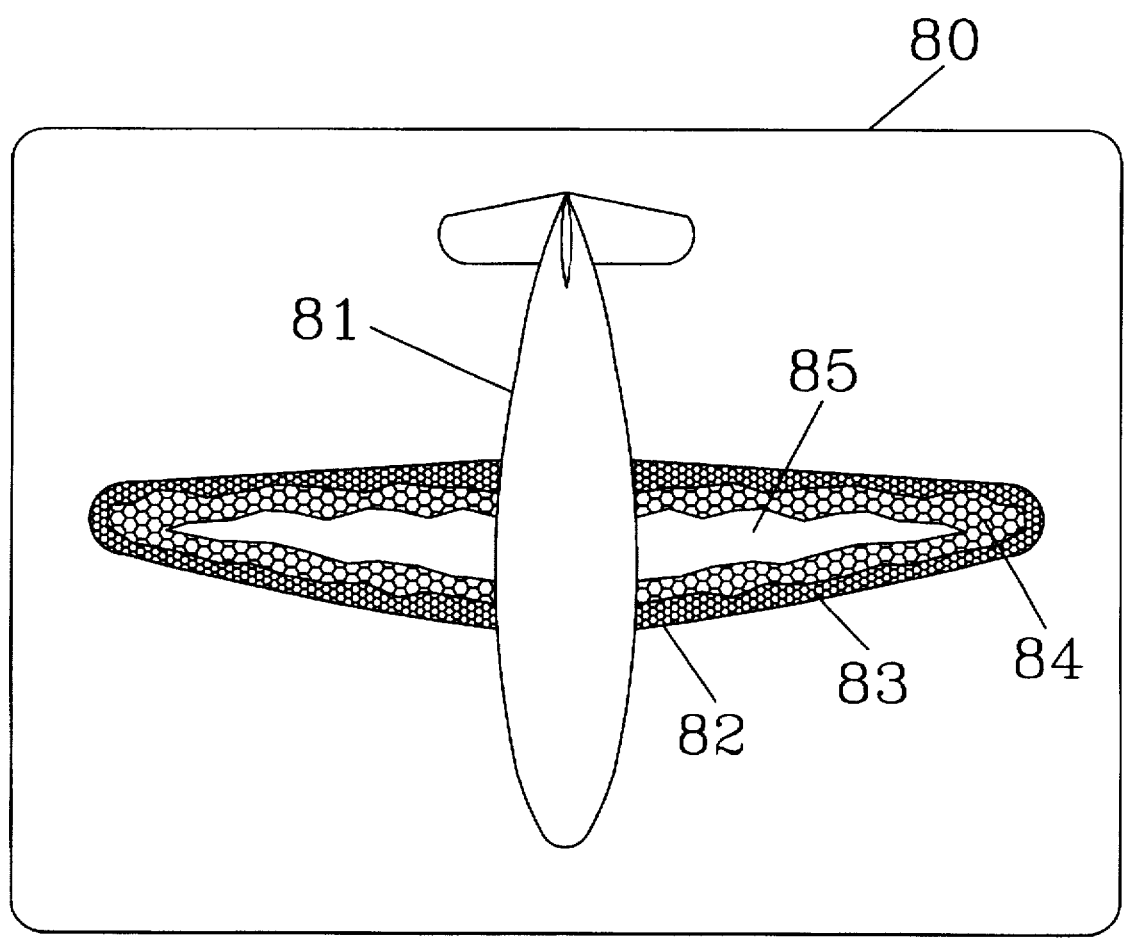
FIG. 7 is an example of a video display showing icing of an aircraft.

FIG. 7 is an example of a video display that may be used in the system of FIG. 6. For example, display 76 (FIG. 6) may have a video screen 80 showing a top view of an aircraft 81. Wings 82 have a thick coating of ice 83 around the edges of the wings. A thinner coating of ice 84 is shown on the thicker part of wings 82. The central portion 85 may have an even thinner layer, or no ice at all. The various thicknesses of ice may be displayed by different colors, hues and/or intensities. After deicing, the aircraft then may be scanned again to determine the effectiveness of the deicing process, and determine if additional deicing is necessary.

The system of FIG. 6 may include a direct communication link between the ice detection system so that, upon a determination of the system that there is or is not ice, this information can be directly transmitted to the aircraft pilot to provide a go no-go indication, dependent upon icing conditions on the aircraft. The data Processor 68, for example, would contain an artificial intelligence decision maker to determine, based upon preprogrammed conditions, if the aircraft requires deicing.

Figure 8:
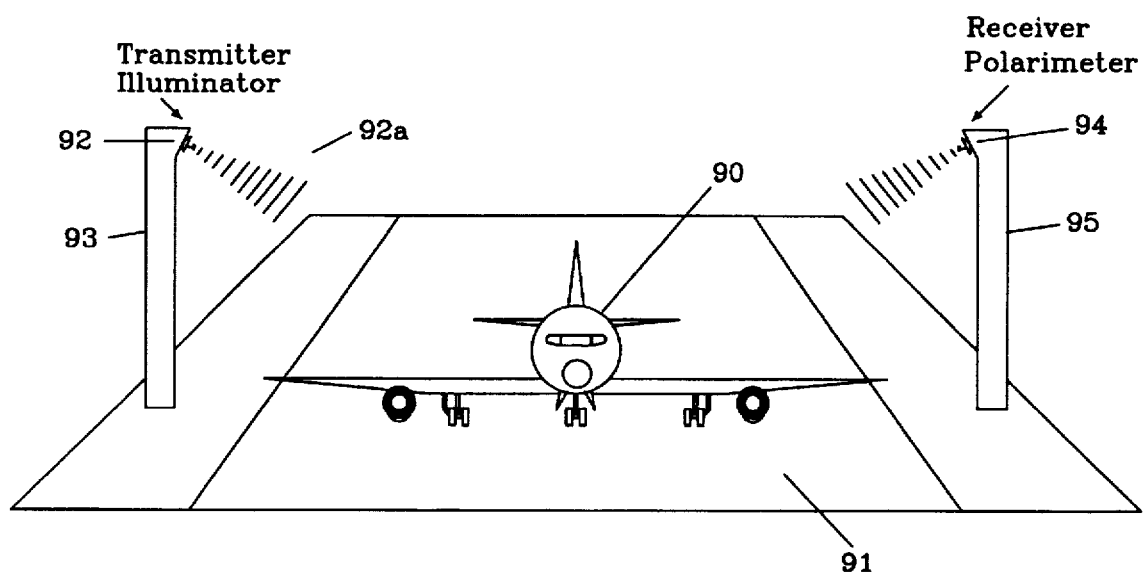
FIG. 8 is an embodiment of the invention utilizing a fixed ice detection and measuring station.

FIG. 8 shows a fixed detection station on an airport runway 91. The aircraft 90 taxis between a transmitter 92 mounted on tower 93 and receiver 94 mounted on tower 95. Transmitter 92 transmits signal 92a Which is reflected off aircraft 90, and is received by receiver 94. The operation is the same as in the system of FIG. 4. The detection station is located near the takeoff point of the runway which is the most efficient and safe location to minimize any ice build between push-off from the gate and takeoff.

The system of the invention can also be used to detect ice build-up on other surfaces such as roads and bridges. In this respect, monitors can be set up on road and bridges to provide information relating to ice build-up on these surfaces.

What is claimed:

1. A system for determining the thickness of a material on a conductive surface, comprising:
    a generator for producing a Radio Frequency signal;
    a first antenna for transmitting a polarized Radio Frequency signal;
    a second antenna for receiving both components of a de-polarized reflected Radio Frequency signal after said signal is reflected from a conductive surface having a material thereon;
    a vector analyzer and processor for producing an output vector signal indicative of the thickness and permittivity of the material on the conductive surface based upon the de-polarized reflected signal; and
    a display for showing the location and thickness of the material on the conductive surface.

2. The system according to claim 1, wherein said second antenna is a dual polarized antenna.

3. The system according to claim 1, wherein said Radio Frequency signal is a linear polarized signal.

4. The system according to claim 1, wherein said Radio Frequency signal is a slant polarized signal.

5. The system according to claim 1, wherein said Radio Frequency signal is a circular polarized signal.

6. The system according to claim 1, wherein said display imdicates location and thickness of the material based upon color and hue of a displayed image.

7. The system according to claim 1, including a control unit for positioning said first and second antennas over a surface on which the thickness of a material is to be measured.

8. The system according to claim 1, in combination with a motor vehicle for transporting the system and for positioning the first and second antennas over a surface on which the thickness of a material is to be measured.

9. The system according to claim 8, wherein said first and second antennas are mounted on a movable arm, attached to said vehicle, for positioning said antennas.

10. A mobile system for determining the thickness of a material on a conductive surface, comprising:
    a generator for producing a Radio Frequency signal;
    a first antenna for transmitting a polarized Radio Frequency signal;
    a second antenna for receiving both components of a de-polarized reflected Radio Frequency signal after said signal is reflected from a conductive surface having a material thereon;
    a vector analyzer and processor for producing an output vector signal indicative of the thickness and permitivity of the material on the conductive surface based upon the de-polarized reflected signal;
    a display for showing the location and thickness of the material on the conductive surface; and
    a motor vehicle for transporting the system and for positioning the first and second antennas over a surface on which the thickness of a material is to be measured.

11. The system according to claim 10, wherein said second antenna is a dual polarized antenna.

12. The system according to claim 10, wherein said Radio Frequency signal is a linear polarized signal.

13. The system according to claim 10, wherein said Radio Frequency signal is a slant polarized signal.

14. The system according to claim 10, wherein said Radio Frequency signal is a circular polarized signal.

15. The system according to claim 10, wherein said display indicates location and thickness of the material based upon color and hue of a displayed image.

16. The system according to claim 10, including a control unit for positioning said first and second antennas over a surface on which the thickness of a material is to be measured.

17. A method for determining the thickness of a material on a conductive surface, comprising the steps of:
    irradiating, at a known angle, a polarized Radio Frequency signal onto the conductive surface having a material thereon;
    detecting a de-polarized Radio Frequency signal reflected from the conductive surface;

processing the de-polarized signal to produce an output vector signal indicative of the thickness of the material on the conductive surface.

18. The method according to claim 17, wherein the Radio Frequency signal is linearly polarized.

19. The method according to claim 17, wherein the Radio Frequency signal is circular polarized.

20. The method according to claim 17, wherein the Radio Frequency signal is slant polarized.

21. A system for determining the thickness of ice on aircraft surfaces, comprising:

a generator for producing a Radio Frequency signal;

a first antenna for transmitting a polarized Radio Frequency signal;

a second antenna for receiving both components of a de-polarized reflected Radio Frequency signal after said signal is reflected from an aircraft surface having ice thereon;

a vector analyzer and processor for producing an output vector signal indicative of the thickness and permittivity of the ice on the aircraft based upon the de-polarized reflected signal; and a display for showing the location and thickness of the ice on the aircraft surface.

* * * * *